United States Patent
Patel et al.

(10) Patent No.: US 8,744,336 B2
(45) Date of Patent: Jun. 3, 2014

(54) INTERFERENCE DETECTION APPARATUS AND METHOD

(75) Inventors: Shrenik Patel, San Diego, CA (US); Prasad Gudem, San Diego, CA (US); Saraswathi Palakurty, San Diego, CA (US)

(73) Assignee: Qualcomm Incorporated, San Deigo, CA (US)

( * ) Notice: Subject to any disclaimer, the term of this patent is extended or adjusted under 35 U.S.C. 154(b) by 837 days.

(21) Appl. No.: 12/199,113

(22) Filed: Aug. 27, 2008

(65) Prior Publication Data

US 2010/0052968 A1    Mar. 4, 2010

(51) Int. Cl.
*H04K 3/00* (2006.01)

(52) U.S. Cl.
CPC .......................................... *H04K 3/82* (2013.01)
USPC ............................. 455/1; 455/63.1; 455/67.11

(58) Field of Classification Search
CPC ......................................................... H04K 3/82
USPC ......................................... 455/1, 67.11, 63.1
See application file for complete search history.

(56) References Cited

U.S. PATENT DOCUMENTS

| | | | |
|---|---|---|---|
| 3,958,083 A | 5/1976 | Hara et al. | |
| 4,752,939 A * | 6/1988 | Amoroso et al. | 375/134 |
| 4,973,966 A | 11/1990 | Zeewy | |
| 5,121,202 A | 6/1992 | Tanoi | |
| 5,448,598 A | 9/1995 | Yousefi et al. | |
| 5,471,509 A | 11/1995 | Wood et al. | |
| 6,429,696 B1 | 8/2002 | Kao et al. | |
| 6,980,786 B1 | 12/2005 | Groe | |
| 7,454,190 B2 | 11/2008 | Schrodinger | |
| 2002/0101936 A1 | 8/2002 | Wright et al. | |
| 2004/0198284 A1 | 10/2004 | Khorram | |

(Continued)

FOREIGN PATENT DOCUMENTS

| | | |
|---|---|---|
| CN | 1266559 A | 9/2000 |
| CN | 101366268 A | 2/2009 |

(Continued)

OTHER PUBLICATIONS

Alberto Valdes-Garcia, et al., "A Broadband CMOS Amplitude Detector for On-Chip RF Measurements" IEEE Transactions on Instrumentation and Measurement, IEEE Service Center, Piscataway, NJ, US, vol. 57, No. 7, Jul. 1, 2008, pp. 1470-1477, XP011205113 ISSN: 0018-9456 p. 1471, right-hand column; figure 2.

(Continued)

*Primary Examiner* — Fayyaz Alam
(74) *Attorney, Agent, or Firm* — S. Hossain Beladi

(57) ABSTRACT

Techniques for detecting jammers in a received signal are described. A jammer detector includes a jammer filter for attenuating transmit signals leaked into the receive path, a pulse generator for converting the interference signals into discrete-level pulses, and a pulse processor for determining the presence of jammers in the discrete-level pulses. In an exemplary embodiment, the pulse processor is configured to further discriminate among close-in jammers that are close to the desired receive frequency, far-away jammers, and jammers arising from the transmit signals leaked into the receive path. In another exemplary embodiment, hysteresis is provided in the pulse generator to enable the generation of reliable pulses. Further aspects include configuring the jammer detector for operation in a plurality of frequency bands and/or according to a plurality of communications standards.

48 Claims, 8 Drawing Sheets

(56) References Cited

U.S. PATENT DOCUMENTS

| | | |
|---|---|---|
| 2005/0130687 A1 | 6/2005 | Filipovic et al. |
| 2005/0215204 A1 | 9/2005 | Wallace et al. |
| 2005/0221790 A1 | 10/2005 | Persico et al. |
| 2005/0285781 A1 | 12/2005 | Park et al. |
| 2006/0255860 A1 | 11/2006 | Moussavi |
| 2007/0230610 A1 | 10/2007 | Poberezhskiy |
| 2007/0232219 A1* | 10/2007 | Xiong ................ 455/1 |
| 2007/0262817 A1 | 11/2007 | Ciccarelli et al. |
| 2008/0069013 A1 | 3/2008 | Monier et al. |
| 2009/0066394 A1 | 3/2009 | Kanda et al. |
| 2009/0128706 A1 | 5/2009 | Nagasawa et al. |
| 2010/0040178 A1 | 2/2010 | Sutton et al. |
| 2010/0245151 A1 | 9/2010 | Muthali et al. |

FOREIGN PATENT DOCUMENTS

| | | |
|---|---|---|
| EP | 0987825 | 3/2000 |
| EP | 1635240 A1 | 3/2006 |
| JP | H08307924 A | 11/1996 |
| JP | H11239065 A | 8/1999 |
| JP | 2001053630 A | 2/2001 |
| JP | 2003069436 A | 3/2003 |
| JP | 2004328639 A | 11/2004 |
| KR | 20090005189 A | 1/2009 |
| TW | 200807901 A | 2/2008 |

OTHER PUBLICATIONS

International Search Report and Written Opinion—PCT/US2009/055240—International Search Authority, European Patent Office, Dec. 16, 2009.

Schlogl F, et al., "120nm CMOS OPAMP with 690 MHz fT and 128 dB DC gain" Solid-State Circuits Conference, 2005. ESSCIRC 2005. Proceedings of the 31st European, IEEE, Piscataway, NJ, USA LNKDDOI: 10.1109/ESSCIR.2005.1541607, Sep. 12, 2005, pp. 251-254, XP010854950 ISBN: 978-0-7803-9205-2.

Tetsuro Itakura, et al., "A Feedforward Technique With Frequency-Dependent Current Mirrors for a Low-Voltage Wideband Amplifier" IEEE Journal of Solid-State Circuits, IEEE Service Center, Piscataway, NJ, US LNKD-001:10.1109/4.509872, vol. 31, No. 6, Jun. 1, 1996, pp. 847-849, XP000620189 ISSN: 0018-9200.

Taiwan Search Report—TW098128883—TIPO—Oct. 11, 2012.

Voo, et al., High-speed current mirror resistive compensation technique, Electronics Letters, 1995, vol. 31, vol. 4, pp. 248-250.

\* cited by examiner

INTERFERENCE DETECTION APPARATUS AND METHOD

BACKGROUND

1. Field

The present disclosure relates generally to communications devices, and more specifically, to techniques for detecting interference in communications receivers.

2. Background

In a communications system, a receiver receives a signal from a transmitter, typically in the presence of noise and interference, and attempts to recover the information sent by the transmitter. Examples of interference may include TX jammers arising from signal leakage from a transmit (TX) signal path co-located with the receiver, as well as jammers derived from other sources. Strong jammers may desensitize a receiver due to, e.g., the non-linear characteristics of the receiver which may mix the jammer signals into the desired signal.

To deal with strong jammers, a receiver may be designed to support both normal and high-linearity operating modes. In the high-linearity operating mode, the receiver may offer better linearity characteristics to minimize the distortion caused by the strong jammers, typically at the cost of greater power consumption. The receiver may be configured to switch from a normal operating mode to a high-linearity operating mode upon the detection of strong enough jammers. This feature demands the availability of jammer detectors that can reliably sense the presence of strong jammers in a received signal.

It would be desirable to provide jammer detectors that are low-cost, reliable, and easily configurable for operation in a plurality of frequency bands and/or according to a plurality of communications standards.

SUMMARY

An aspect of the present disclosure provides an apparatus for detecting jammers in a received signal, the apparatus comprising: a pulse generator, an input signal to the pulse generator coupled to the received signal, the pulse generator comprising at least one comparator for generating an output signal based on comparing the input signal to a reference level; and a pulse processor, an input signal to the pulse processor coupled to the output signal of the pulse generator, the pulse processor configured to compute a pulse frequency metric for the pulse generator output signal over a time window, accumulate the pulse frequency metric over a plurality of time windows to generate a first accumulated metric, and generate a first jammer detection signal if the first accumulated metric exceeds a first threshold.

Another aspect of the present disclosure provides an apparatus for detecting jammers in a received signal, the apparatus comprising: means for generating pulses based on comparing the received signal to a reference level; and means for detecting the presence of a jammer based on said generated pulses.

Yet another aspect of the present disclosure provides a method for detecting jammers in a received signal, the method comprising: generating a pulse generator output signal based on comparing the received signal to a reference level; computing a pulse frequency metric for the pulse generator output signal over a time window; accumulating the pulse frequency metric over a plurality of time windows to generate a first accumulated metric; and generating a first jammer detection signal if the first accumulated metric exceeds a first threshold.

Yet another aspect of the present disclosure provides a computer program product for detecting jammers in a received signal, the product comprising: computer-readable medium comprising: code for causing a computer to input a plurality of digital pulses, the digital pulses generated by comparing a received signal to a reference level; code for causing a computer to compute a pulse frequency metric for the digital pulses over a time window; code for causing a computer to accumulate the pulse frequency metric over a plurality of time windows to generate a first accumulated metric; and code for causing a computer to generate a first jammer detection signal if the first accumulated metric exceeds a first threshold.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

According to the present disclosure, techniques are provided to detect jammers present in a signal received by a receiver. The techniques described herein may be used for a wireless device, a base station, and other electronics devices. A wireless device may also be referred to as a mobile station, a user equipment, a user terminal, a subscriber unit, etc. A wireless device may be a cellular phone, a personal digital assistant (PDA), a wireless modem, a handheld device, a handset, etc. The techniques may also be used for various communication systems such as Code Division Multiple Access (CDMA) systems, Time Division Multiple Access (TDMA) systems, Frequency Division Multiple Access (FDMA) systems, Orthogonal FDMA (OFDMA) systems, etc.

Figure 1:
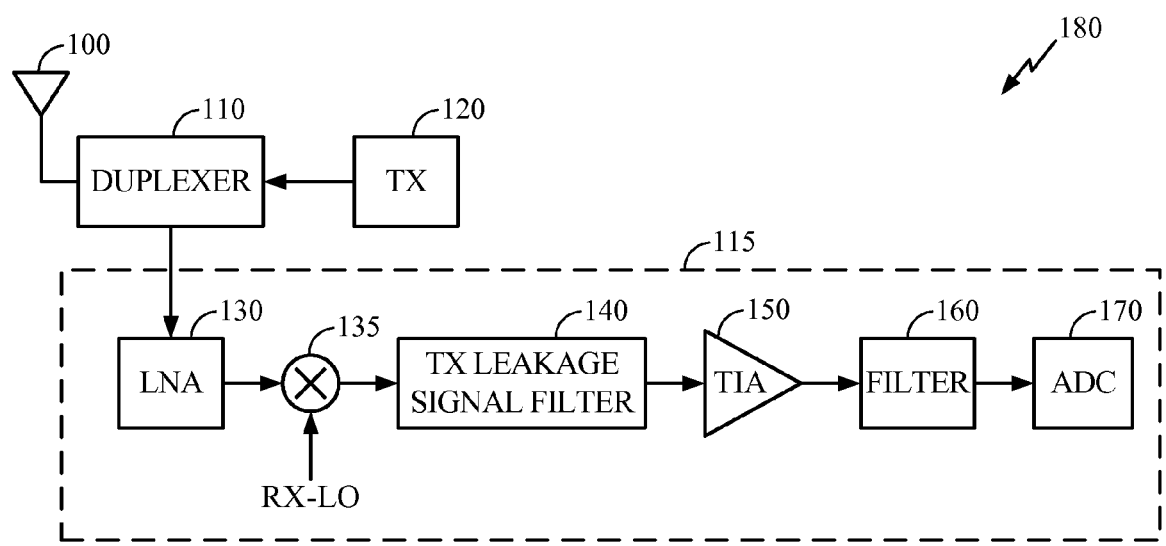
FIG. 1 shows a block diagram of a prior art wireless device 180 that includes an antenna 100 coupled to a duplexer 110.

FIG. 1 shows a block diagram of a prior art wireless device 180 that includes an antenna 100 coupled to a duplexer 110. The duplexer 110 allows the antenna to be shared between a transmitter section (TX) 120 that generates a signal to be transmitted over the antenna 100, and a receiver section (RX) 115 that receives a signal over the antenna 100. The RX 115 includes a low-noise amplifier (LNA) 130, an RX mixer 135 for mixing the received amplified signal with an RX local oscillator (LO) signal, and a TX leakage signal filter 140 designed to attenuate interference signals originating from the TX 120. The output of the TX leakage signal filter 140 may be amplified by a trans-impedance amplifier (TIA) 150, further filtered by filter 160, and digitized by an analog-to-digital converter (ADC) 170.

Note the block diagram in FIG. 1 is shown for illustrative purposes only, and is not meant to limit the techniques of the present disclosure to any particular implementation of a wireless device. In particular, one of ordinary skill in the art will appreciate that the signals shown may be differential or single-ended. Additional blocks such as filters, amplifiers, and/or other gain control elements may be incorporated. Such implementations are contemplated to be within the scope of the present disclosure.

In general, a receiver may be implemented with a super-heterodyne architecture, a direct-to-baseband architecture, or other types of architectures. In the super-heterodyne architecture, the received signal is frequency downconverted in multiple stages, e.g., from RF to an intermediate frequency (IF) in one stage, and then from IF to baseband in another stage. In the direct-to-baseband architecture, the received signal is frequency downconverted from RF directly to baseband in one stage. Different receiver architectures may use different circuit blocks and/or have different requirements. For clarity, the following description is for a direct-to-baseband architecture.

Figure 2:
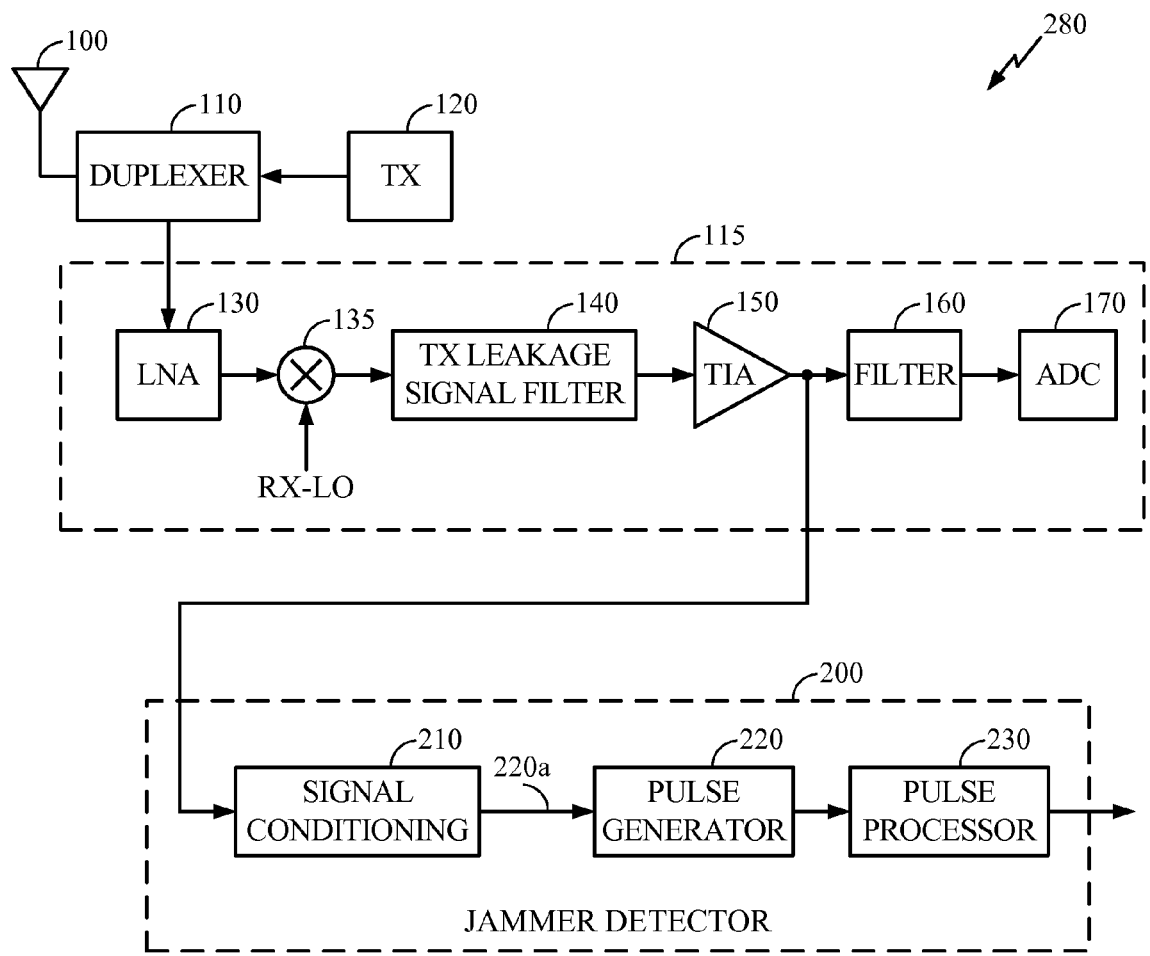
FIG. 2 depicts an exemplary embodiment of a jammer detector 200 according to the present disclosure.

FIG. 2 depicts an exemplary embodiment of a jammer detector 200 in a wireless device 280 according to the present disclosure. In FIG. 2, the output of the TIA 150 is also supplied as the input signal to the jammer detector 200. In this exemplary embodiment, the input signal to the jammer detector 200 may be a current signal. In alternative exemplary embodiments, the input signal to the jammer detector 200 may be voltage, or power, or it may be first digitized. One of ordinary skill in the art will also appreciate that the input signal is not limited to the output of a TIA 150 such as shown in FIG. 2, and may generally be taken from other nodes within the RX 115. Such alternative exemplary embodiments are contemplated to be within the scope of the present disclosure.

In FIG. 2, the jammer detector 200 is shown to include a signal conditioning block 210, a pulse generator 220, and a pulse processor 230. The signal conditioning block 210 may condition the input signal to the jammer detector 200, and may include, e.g., filters for removing certain interference signals whose frequencies are known a priori. The pulse generator 220 generates a set of discrete-amplitude pulses based on comparing the output signal of the signal conditioning block 210 with one or more reference levels. The pulse processor 230 applies a digital algorithm to determine the presence or lack of interferers in the RX signal, based on the output of the pulse generator 220.

Note the block diagram of the jammer detector 200 in FIG. 2 is shown for illustrative purposes only, and is not meant to limit the techniques of the present disclosure to any particular implementation of a jammer detector. In particular, one of ordinary skill in the art will appreciate that the signals shown may be differential or single-ended. Additional blocks such as filters, amplifiers, and/or other gain control elements may be incorporated. For example, in an exemplary embodiment, a high-pass filter (not shown) may be additionally provided to compensate for undesired frequency variations introduced by the signal conditioning block 210 and/or TX leakage signal filter 140. Such implementations are contemplated to be within the scope of the present disclosure.

Disclosed further herein are specific exemplary embodiments of the jammer detector blocks described above. Note the exemplary embodiments are given herein for illustrative purposes only, and are not meant to limit the scope of the present disclosure to any particular exemplary embodiments of the jammer detector blocks described. One of ordinary skill in the art will appreciate that the techniques described may be selectively applied to an actual implementation of a jammer detector. For example, the techniques described herein for designing a pulse generator 220 may be combined with techniques for designing a pulse processor 230 other than those described herein. Such exemplary embodiments are contemplated to be within the scope of the present disclosure.

Figure 3:
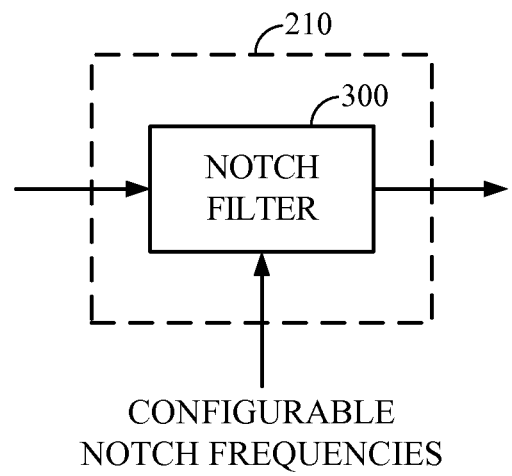
FIG. 3 depicts an exemplary embodiment of a signal conditioning block 210.

FIG. 3 depicts an exemplary embodiment of a signal conditioning block 210. In FIG. 3, the signal conditioning block 210 includes a configurable notch filter 300. In an exemplary embodiment, the notch frequency or frequencies of the notch filter may correspond to a frequency or frequencies associated with a TX signal transmitted by the TX 120 that "leaks" into the RX signal path and interferes with the RX signal. Such TX leakage signals may arise from, e.g., imperfect duplexer isolation and/or imperfect TX leakage signal filtering. Strong TX leakage signals may desensitize a receiver, and may also undesirably mask the presence of other weaker jammers in the RX signal. In the exemplary embodiment shown, the notch filter 300 may be specifically configured to target the TX leakage signal frequencies, which are generally known a priori based on operation of the TX signal chain in the same device 280. As a result of the notch filtering in the signal conditioning block 210, the subsequent pulse generator 220 and pulse processor 230 blocks in the jammer detector 200 may be more sensitized to jammer signals not arising from TX leakage.

In an exemplary embodiment wherein a transmitter is configured to operate over multiple frequency bands, the notch frequencies of the notch filter 300 may be configured based on the specific frequency band chosen.

In a further exemplary embodiment (not shown), the signal conditioning block 210 may be omitted altogether.

Figure 4:
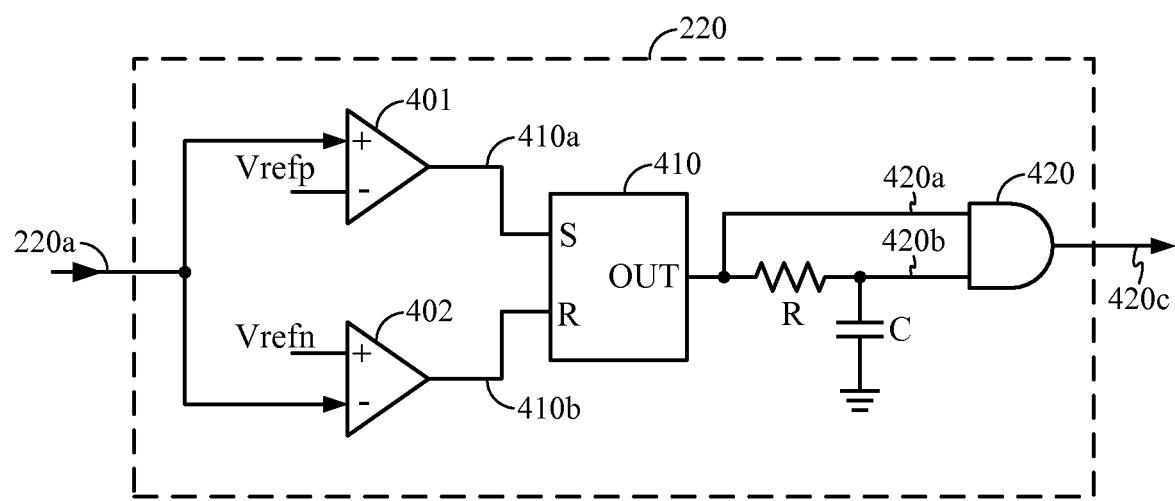
FIG. 4 depicts an exemplary embodiment of a pulse generator 220 for generating discrete-amplitude pulses indicating when a received signal exceeds one or more pre-programmed interference-detection thresholds.

FIG. 4 depicts an exemplary embodiment of a pulse generator 220 for generating discrete-amplitude pulses that compare the amplitude of an input signal with one or more pre-programmed interference-detection thresholds.

In FIG. 4, two comparators 401 and 402 are coupled to the input signal 220a to the pulse generator 220. Comparator 401 compares the input signal 220a to a positive reference Vrefp, and outputs a logical HI signal if the input signal exceeds Vrefp. Comparator 402 compares the input signal 220a to a negative reference Vrefn, and outputs a logical HI signal if the input signal is less than Vrefn. The output signals 410a and 410b of comparators 401 and 402, respectively, are provided to an S-R latch 410. The output signal 420a of S-R latch 410 is provided to one input of an AND gate 420, and an R-C filtered version 420b of the S-R latch output signal 420a is provided to the other input of the AND gate 420. The output signal 420c of the AND gate is provided as the output of pulse generator 220.

The circuitry shown in FIG. 4 operates to detect whether an input signal to the pulse generator 220 exceeds a threshold Vrefp, subject to hysteresis and filtering to combat the effects of noise, as further described hereinbelow with reference to FIGS. 5A-5D.

Figure 5A:
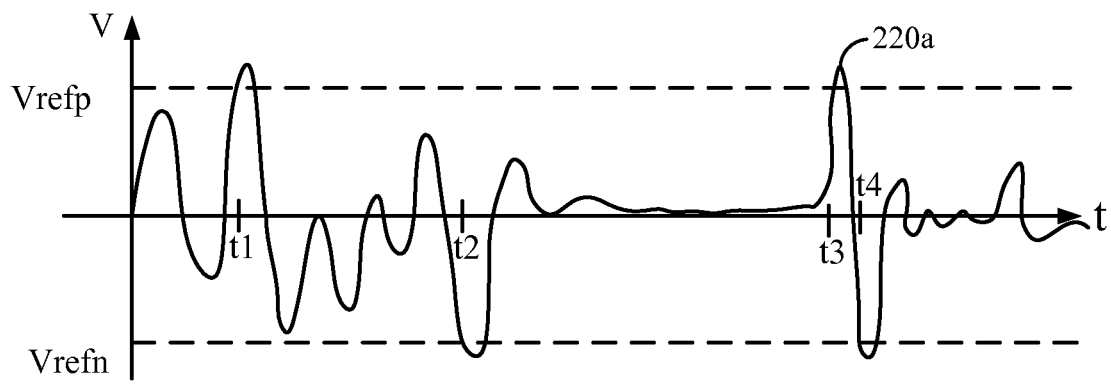
FIGS. 5A-5D illustrate examples of signals present in the pulse generator 220 exemplary embodiment shown in FIG. 4.

FIG. 5A illustrates an example of the input signal 220a to the pulse generator 220. The input signal 220a possibly contains interference arising from, e.g., TX leakage signals, other jammers, and noise. Note the waveform in FIG. 5A is shown for illustrative purposes only, and is not meant to suggest that the particular waveforms present in an exemplary embodiment of the present disclosure will have the amplitude or timing characteristics depicted.

FIG. 5A depicts the thresholds Vrefp and Vrefn of the comparators 401 and 402, respectively, relative to the signal 220a. In an exemplary embodiment, Vrefn may be made equal to the negative of Vrefp, i.e., Vrefn=–Vrefp. In an exemplary embodiment, the thresholds Vrefp and Vrefn may be chosen to detect the presence of any or all jammers within a given frequency range of interest.

Figure 5B:
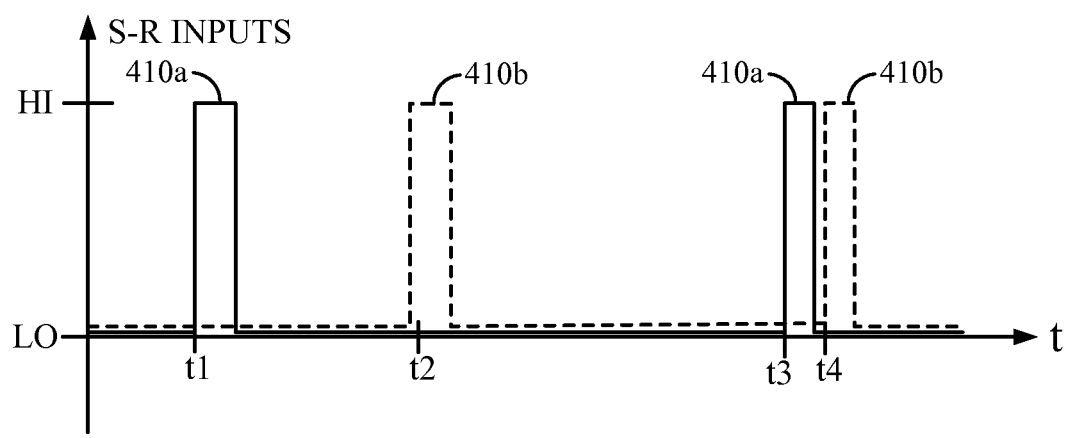

As illustrated in FIG. 5B, when signal 220a is greater than the level Vrefp, the output 410a of comparator 401 transitions to a logical HI, and stays HI until 220a drops below Vrefp. In the example shown, signal 410a transitions HI at times t1 and t3. Similarly, when signal 220a is less than the level Vrefn, the output 410b of comparator 402 transitions to a logical HI, and stays HI until 220a becomes greater than Vrefn. In the example shown, signal 410b transitions HI at times t2 and t4.

Figure 5C:
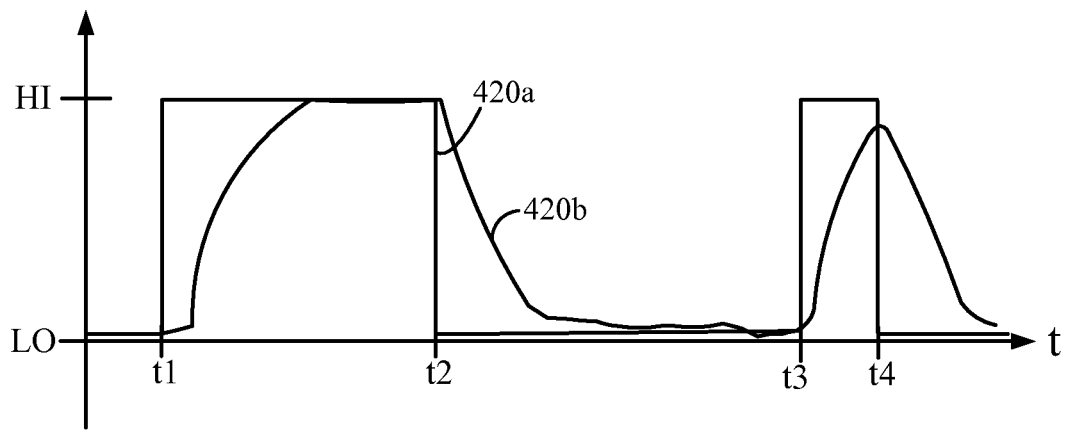

FIG. 5C illustrates the output signal 420a of the S-R latch in response to the signals 410a and 410b shown in FIG. 5B. In FIG. 5C, the signal 420a is seen to transition HI at time t1 due to the "S" input (or signal 410a) to the latch transitioning HI, and to transition LO at time t2 due to the "R" input (or signal 410b) to the latch transitioning HI. FIG. 5C also illustrates the signal 420b, which is the RC-filtered version of signal 420a.

Figure 5D:
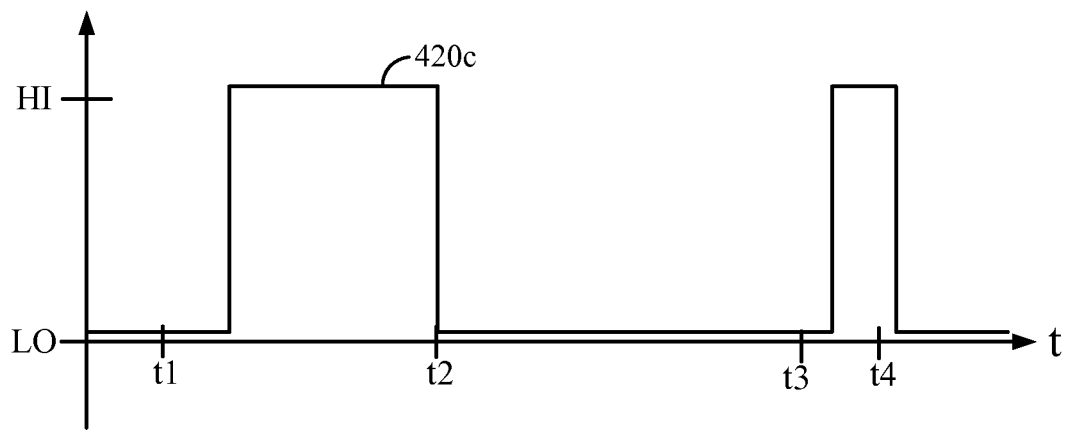

FIG. 5D illustrates the output 420c of the AND gate 420 in response to the signals 420a and 420b shown in FIG. 5C.

Note the exemplary embodiment depicted in FIG. 4 is shown for illustrative purposes only, and is not meant to limit the scope of the disclosure to any particular implementation of a pulse generator 220. One of ordinary skill in the art may readily derive alternative implementations of circuitry to generate discrete-level pulses indicative of signal level given an input signal to a pulse generator 220. Such alternative implementations may or may not adopt the hysteresis and/or filtering techniques described with reference to the circuitry of FIG. 4. Furthermore, alternative ways to implement such hysteresis and/or filtering may also be readily derived by one of ordinary skill in the art in light of the present disclosure. These and other exemplary embodiments of a pulse generator are contemplated to be within the scope of the present disclosure.

In an exemplary embodiment (not shown), the circuitry of FIG. 4 may be designed to process differential signals, rather than the single-ended signals depicted in FIGS. 5A-5D. Such differential processing may provide greater rejection of, e.g., common-mode noise. One of ordinary skill in the art may readily derive such differential implementations given the circuitry and operation described with reference to FIGS. 4 and 5A-5D.

Figure 6:
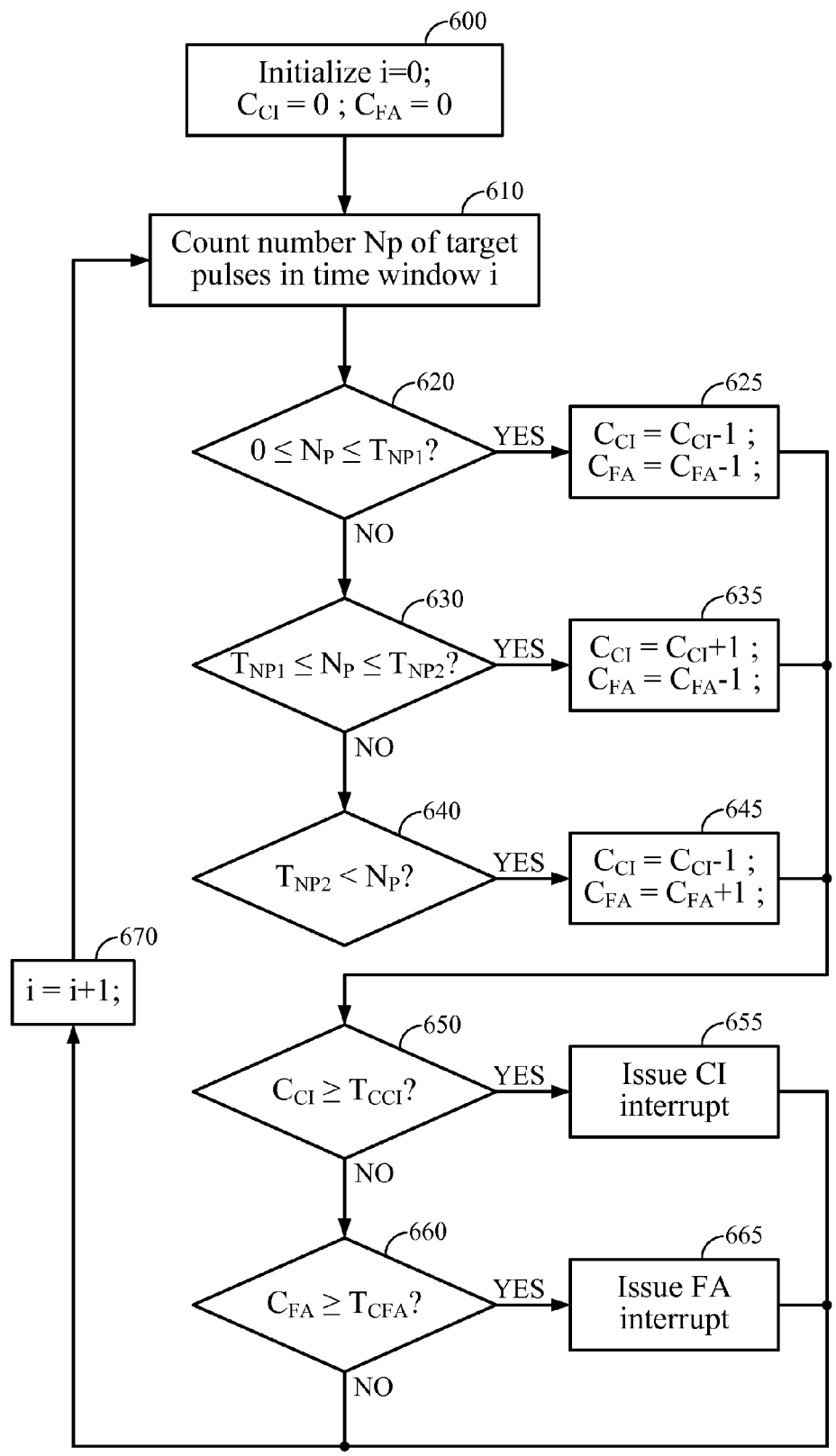
FIG. 6 depicts an exemplary embodiment of the method steps performed by a pulse processor module 230.

FIG. 6 depicts an exemplary embodiment of the method steps performed by a pulse processor module 230. In particular, the pulse processor module 230 may process the output of the pulse generator 220 to detect the presence of jammers in the received signal. In an exemplary embodiment, the pulse processor 230 may compute a pulse frequency metric that is related to the frequency of pulses in the pulse generator output signal. In an exemplary embodiment, the pulse frequency metric may be a counter metric that counts the number of pulses within a time window. In an alternative exemplary embodiment, the pulse frequency metric may be a timer metric that measures a time interval between successive rising edges in the pulse generator output signal. For illustrative purposes, FIG. 6 shows an exemplary embodiment wherein the pulse frequency metric is a counter metric that counts the number of pulses within a time window. FIG. 6, however, is not meant to restrict the scope of the present disclosure to any particular method for pulse processing, or any particular exemplary embodiment of a pulse frequency metric, explicitly illustrated.

In FIG. 6, at step 600, variables i, $C_{CI}$, and $C_{FA}$ are each initialized to zero. In the exemplary embodiment shown, i may correspond to a counter indexing a specific time window over which pulses from the pulse generator 220 are processed. $C_{CI}$ and $C_{FA}$ may be variables that track the presence of "close-in" jammers and "far-away" jammers, respectively, detected in the pulses from the pulse generator 220. A close-in jammer may refer to a jammer that is relatively close to the desired RX signal in frequency, while a far-away jammer may refer to a jammer that is relatively far from the desired RX signal in frequency.

For example, in an exemplary embodiment wherein the desired RX signal is downconverted to baseband, a close-in jammer may correspond to a low jammer frequency after downconversion, while a far-away jammer may correspond to a higher jammer frequency after downconversion. One of ordinary skill in the art will appreciate that a close-in jammer may then correspond to a low pulse count at the output of the pulse generator output, while a far-away jammer may correspond to a higher pulse count.

At step 610, a number of target pulses Np contained in the output of pulse generator 220 may be counted in a time window indexed by counter i. In an exemplary embodiment, the duration of a time window may correspond to a predetermined number of cycles of a given reference clock, e.g., 512 cycles of a 19.2-MHz XO (crystal oscillator) reference clock. In an exemplary embodiment, the number Np of pulses counted in the time window may be filtered such that they correspond to only those pulses in the output of the pulse generator 220 attributable to jammers that do not originate from TX leakage. Specific exemplary embodiments of the operations carried out in step 610 to achieve such a filtering effect are later described with reference to FIGS. 7 and 8.

At steps 620-640, the number of target pulses Np counted at step 610 are compared to a series of thresholds. In an exemplary embodiment, the thresholds are chosen to determine whether there exist in the pulse generator output: 1) no jammers, 2) close-in jammers, or 3) far-away jammers.

Step 620 determines whether Np falls within a range from 0 to a threshold $T_{Np1}$, inclusive of 0 and $T_{Np1}$. If so, counters $C_{CI}$ and $C_{FA}$ may both be decremented by 1 at step 625.

Step 630 determines whether Np falls within a range from $T_{Np1}$ to a threshold $T_{Np2}$, inclusive of $T_{Np2}$. If so, counter $C_{CI}$ may be incremented by 1, while counter $C_{FA}$ may be decremented by 1 at step 635.

Step 640 determines whether Np is greater than $T_{Np2}$. If so, counter $C_{CI}$ may be decremented by 1, while counter $C_{FA}$ may be incremented by 1 at step 645.

Once Np has been assigned to the appropriate jammer detection range, the method proceeds to step 650. At step 650, the counter $C_{CI}$ is checked to determine whether it exceeds a threshold $T_{CCI}$, whereupon the method proceeds to issue a CI interrupt at step 655. The execution of step 655 may indicate that a close-in jammer, corresponding to a signal having low frequency after downconversion, has been detected in the pulse generator output. In an exemplary embodiment, the CI interrupt may be a signal originating from digital hardware that is sent to RF RX circuitry, instructing the RF RX circuitry to alter its operation based on the detection of the close-in jammer signals.

At step 660, the counter $C_{FA}$ is checked to determine whether it exceeds a threshold $T_{CFA}$, whereupon the method proceeds to issue an FA interrupt at step 665. The execution of step 665 may indicate that a far-away jammer, corresponding to a signal having high frequency after downconversion, has been detected in the pulse generator output. In an exemplary embodiment, the thresholds $T_{CCI}$ and $T_{CFA}$ may be equal in value.

At step 670, the counter i is incremented, and the method returns to step 610.

Note the method described with reference to FIG. 6 is provided for illustrative purposes only. One of ordinary skill in the art may readily derive alternative ways (not shown) to process the pulse generator output to identify the presence of jammers. For example, jammers may be classified into a number of categories more or less than the two categories corresponding to close-in and far-away described. The counters $C_{CI}$ and $C_{FA}$ may be incremented or decremented by values other than those explicitly described. In an exemplary embodiment, the counters may be incremented or decremented by variable values depending on the actual value of Np.

As earlier mentioned, alternative ways to detect the frequency of target pulses Np over time may also be readily derived by one of ordinary skill in the art. For example, in an alternative exemplary embodiment (not shown), the pulse processor may be configured to measure the time difference between consecutive rising edges in the output signal of the pulse generator. A timer may be programmed to start advancing when a rising edge of the pulse generator output crosses a threshold, and to reset when the next rising edge again crosses the threshold; before the reset, the value of the timer may be used to identify the frequency of the jammer. For example, if the timer value is higher than a first threshold, the pulse processor may declare no jammer detected. If the timer value is lower than the first threshold but higher than a second threshold, the pulse processor may declare a close-in jammer detected. If the timer value is lower than the second threshold, the pulse processor may declare a far-away jammer.

Figure 7:
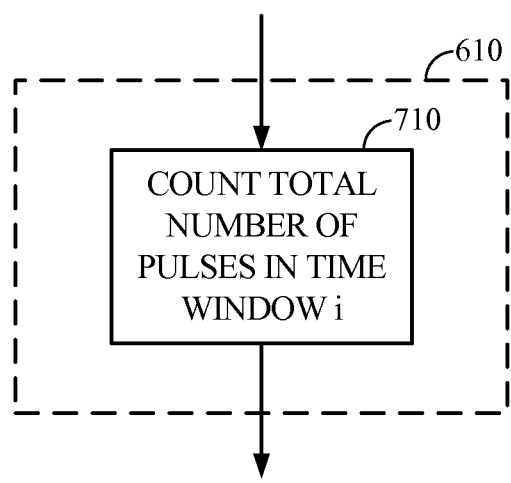
FIG. 7 depicts an exemplary embodiment of step 610 of FIG. 6, wherein the number of target pulses Np in the pulse generator output corresponds to the total number of pulses counted in a time window.

FIG. 7 depicts an exemplary embodiment of step 610 of FIG. 6, wherein the number of target pulses Np in the pulse generator output simply corresponds to the total number of pulses counted in a time window. In FIG. 7, at step 710, the total number of distinct pulses detected in time window i is taken to be the number Np.

One of ordinary skill in the art will appreciate that while the computation of step 710 may be relatively simple to implement, the number of target pulses Np thus counted may generally include pulses attributable to both TX leakage signals and other jammers. In some cases, it may be undesirable to include pulses attributable to TX leakage signals in the number of target pulses Np. It may be desirable to have an algorithm that includes only pulses not attributable to TX leakage signals in the number of target pulses Np. Such an algorithm may seek to maximize the probability that Np will include pulses due to non-TX leakage signal jammers, while minimizing the probability that Np will include pulses due to the TX-leakage signals.

Figure 8:
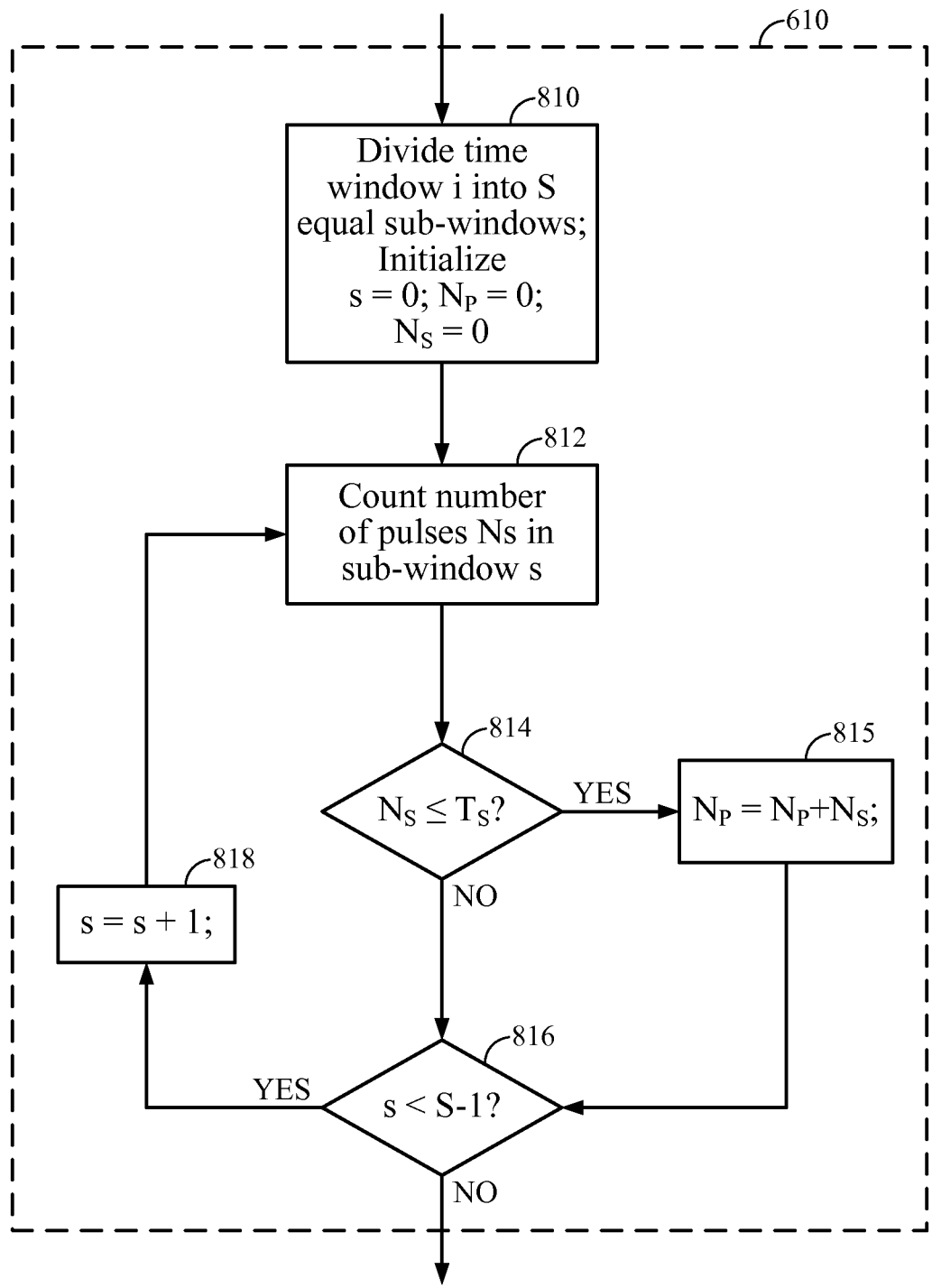
FIG. 8 depicts an exemplary embodiment of step 610 designed to discriminate between TX leakage signals and other jammer signals.

FIG. 8 depicts an exemplary embodiment of step 610 designed to omit, or "filter out," TX leakage signals from the computation of the target number of pulses Np.

In FIG. 8, at step 810, the time window i is divided into a plurality S of equal-duration sub-windows. Also at step 810, the parameters s, Np, and Ns are initialized to zero, wherein s corresponds to an index to each of the sub-windows, and Ns corresponds to a number of pulses counted within a given sub-window.

At step 812, the total number of pulses Ns for sub-window s is counted.

At step 814, the method evaluates whether Ns is less than or equal to a threshold Ts. If so, the method proceeds to step 815, wherein Np is incremented by Ns.

At step 816, the parameter s is checked to determine whether the last sub-window in the time window i has been reached. If so, the method continues to the rest of the steps, e.g., step 620 in FIG. 6. Otherwise, s is incremented, and the method returns to step 812 to evaluate the next sub-window.

One of ordinary skill in the art will realize that the exemplary embodiment shown in FIG. 8 functions to count the pulses from a sub-window s only if Ns is less than the threshold Ts. Such an exemplary embodiment may be advantageous in that the effects of TX-leaked signals, which would normally have a higher frequency after downconversion than non-TX jammers, and thus correspondingly higher Ns, may be removed from the target pulse count Np.

In an exemplary embodiment, the duration of each sub-window and the corresponding threshold Ts may be made dependent on the frequency band of operation. For example, for operation in a 450 MHz RX band, the duration of each sub-window may be 8 cycles of a 19.2-MHz XO reference clock, and Ts may be 1. For operation in a PCS frequency band, the duration of each sub-window may be 2 cycles of the TCXO reference clock, and Ts may be 1. Note the preceding specific values are given for illustration only, and are not meant to limit the scope of the present disclosure to any particular values given.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for detecting jammers in a received signal, the apparatus comprising:
    a pulse generator, an input signal to the pulse generator coupled to the received the pulse generator comprising at least one comparator for generating an output signal comprising a set of discrete-amplitude pulses based on comparing the input signal to a reference level; and
    a pulse processor, an input signal to the pulse processor coupled to the output signal of the pulse generator, the pulse processor configured to compute a pulse frequency metric for the pulse generator output signal over a time window, accumulate the pulse frequency metric over a plurality of time windows to generate a first accumulated metric, and generate a first jammer detection signal in response to a determination that the first accumulated metric exceeds a first threshold.

2. The apparatus of claim 1, the pulse frequency metric comprising a target number of pulses Np counted in the pulse generator output signal over a time window.

3. The apparatus of claim 2, the pulse frequency metric indicating whether Np exceeds a close-in jammer threshold.

4. The apparatus of claim 2, the apparatus further comprising:
    a notch filter, an input signal to the notch filter coupled to the received signal, an output signal of the notch filter coupled to the input signal to the pulse generator.

5. The apparatus of claim 4, the notch filter having at least one notch frequency configurable based on an operating frequency band of the receiver.

6. The apparatus of claim 5, the at least one notch frequency derived from a TX leakage signal of a transmitter co-located with the receiver.

7. The apparatus of claim 2, the pulse generator comprising:
    a first comparator comparing the pulse generator input signal to a positive reference level;
    a second comparator comparing the pulse generator input signal to a negative reference level; and
    an S-R latch having an S-input coupled to the output signal of the first comparator, and an R-input coupled to the output signal of the second comparator, the output signal of the S-R latch coupled to the output signal of the pulse generator.

8. The apparatus of claim 7, the pulse generator further comprising:
    a low-pass filter coupled to the output signal of the S-R latch; and an AND gate having a first input coupled to the output of the S-R latch, and
    a second input coupled to the output of the low-pass filter, the output signal of the AND gate coupled to the output signal of the pulse generator.

9. The apparatus of claim 2, the first accumulated metric comprising a counter variable C1 incremented every time window the target number of pulses Np exceeds a predetermined threshold TNp1.

10. The apparatus of claim 9, the counter variable C1 decremented every time window the target number of pulses Np does not exceed TNp1.

11. The apparatus of claim 9, the pulse processor further configured to generate a second jammer detection signal based on whether a second accumulated metric based on the target number of pulses exceeds a second threshold.

12. The apparatus of claim 11, the second accumulated metric comprising a counter variable C2 incremented every time window the target number of pulses Np exceeds a predetermined threshold TNp2, TNp2 being greater than TNPI.

13. The apparatus of claim 11, the pulse processor further configured to generate the first jammer detection signal only if the second jammer detection signal is not generated.

14. The apparatus of claim 13, the first jammer detection signal indicating the presence of a close-in jammer, the second jammer detection signal indicating the presence of a far-away jammer, the first accumulated metric being a close-in jammer counter metric CCI, the second accumulated metric being a far-away jammer counter metric CFA.

15. The apparatus of claim 2, the first accumulated metric comprising a counter variable C incremented by Np every time window the target number of pulses Np exceeds a predetermined threshold TNPI.

16. The apparatus of claim 2, the target number of pulses Np in a time window comprising all pulses in a time window.

17. The apparatus of claim 2, the target number of pulses Np in a time window computed by:
dividing each time window into a plurality of sub-windows;
determining the total number of pulses in each sub-window; and
accumulating the total number of pulses in each sub-window into the target number of pulses Np only if the total number of pulses in the sub-window exceeds a predetermined threshold Ts.

18. The apparatus of claim 3, the pulse frequency metric comprising time interval between rising edges of the pulse generator output signal, the pulse frequency metric indicating whether the pulse frequency metric is greater or less than a threshold time interval.

19. An apparatus for detecting jammers in a received signal, the apparatus comprising:
means for generating pulses based on comparing the received signal to a reference level; and
means for detecting the presence of a jammer in response to a determination that a pulse frequency metric of said generated pulses exceeds a threshold.

20. The apparatus of claim 19, further comprising:
means for detecting the presence of a close-in jammer versus a far-away jammer based on said generated pulses.

21. The apparatus of claim 19, the means for generating comprising:
means for providing hysteresis to the comparing the received signal to a reference level.

22. The apparatus of claim 19, the means for detecting comprising: means for excluding a TX leakage signal from the detection of a jammer.

23. A method for detecting jammers in a received signal, the method comprising:
generating a pulse generator output signal comprising a set of discrete-amplitude pulses based on comparing the received signal to a reference level;
computing a pulse frequency metric for the pulse generator output signal over a time window;
accumulating the pulse frequency metric over a plurality of time windows to generate a first accumulated metric; and
generating a first jammer detection signal in response to a determination that the first accumulated metric exceeds a first threshold.

24. The method of claim 23, the computing a pulse frequency metric comprising counting a target number of pulses Np in the pulse generator output signal within a time window.

25. The method of claim 24, the pulse frequency metric indicating whether Np exceeds a close-in jammer threshold.

26. The method of claim 24, further comprising:
configuring at least one notch frequency based on an operating frequency band of the receiver; and
notch filtering the received signal before generating the pulse generator output signal with the at least one notch frequency.

27. The method of claim 24, the generating a pulse generator output signal comprising:
comparing the pulse generator input signal to a positive reference level to generate a first comparator output signal;
comparing the pulse generator input signal to a negative reference level to generate a second comparator output signal;
latching the first comparator output signal with a latch when the first comparator output signal transitions; and
resetting the latch when the second comparator output signal transitions.

28. The method of claim 27, the generating a pulse generator output signal further comprising:
low-pass filtering the output signal of the latch; and
providing the output signal of the latch and the low-pass filtered output signal to an AND gate to generate the pulse generator output signal.

29. The method of claim 24, the generating a first jammer detection signal comprising:
incrementing the first accumulated metric every time window the target number of pulses Np exceeds a predetermined threshold TNp1.

30. The method of claim 29, the generating a first jammer detection signal further comprising:
decrementing the first accumulated metric every time window the target number of pulses Np does not exceed TNp1.

31. The method of claim 29, further comprising:
generating a second jammer detection signal based on whether a second accumulated metric based on the target number of pulses exceeds a second threshold.

32. The method of claim 31, the second accumulated metric comprising a counter variable C2 incremented ever time window the target number of pulses Np exceeds a predetermined threshold TNp2, TNp2 being greater than TNp1.

33. The method of claim 32, the first jammer detection signal indicating the presence of a close-in jammer, the second jammer detection signal indicating the presence of a faraway jammer, the first accumulated metric being a close-in jammer counter metric CCI, the second accumulated metric being a far-away jammer counter metric CFA.

34. The method of claim 31, further comprising generating the first jammer detection signal only if the second jammer detection signal is not generated.

35. The method of claim 24, the target number of pulses Np in a time window comprising all pulses in a time window.

36. The method of claim 24, the counting a target number of pulses Np comprising:
dividing each time window into a plurality of sub-windows; determining the total number of pulses in each sub-window; and
accumulating the total number of pulses in each sub-window into the target number of pulses Np only if the total number of pulses in the sub-window exceeds a predetermined threshold Ts.

37. The apparatus of claim 23, the pulse frequency metric comprising a time interval between rising edges of the pulse generator output signal, the first accumulated metric being based on whether the pulse frequency metric is greater or less than a predetermined time interval.

38. A computer program product for detecting jammers in a received signal, the product comprising:
a non-transitory computer-readable medium having software code recorded thereon, comprising:
code for causing a computer to input a plurality of digital pulses, the digital pulses generated by comparing a received signal to a reference level;
code for causing a computer to compute a pulse frequency metric for the digital pulses over a time window;
code for causing a computer to accumulate the pulse frequency metric over a plurality of time windows to generate a first accumulated metric; and
code for causing a computer to generate a first jammer detection signal in response to a determination that the first accumulated metric exceeds a first threshold.

39. The computer program product of claim 38, the pulse frequency metric comprising a target number of pulses Np in the plurality of digital pulses within a time window.

40. The computer program product of claim 39, the code for causing a computer to generate a first jammer detection signal further comprising:
code for causing a computer to increment the first accumulated metric every time window the target number of pulses Np exceeds a predetermined threshold TNp1.

41. The computer program product of claim 40, the code for causing a computer to generate a first jammer detection signal further comprising:
code for causing a computer to decrement the first accumulated metric every time window the target number of pulses Np does not exceed TNp1.

42. The computer program product of claim 40, the non-transitory computer-readable medium further comprising:
code for causing a computer to generate a second jammer detection signal based on whether a second accumulated metric based on the target number of pulses exceeds a second threshold.

43. The computer program product of claim 42, the second accumulated metric comprising a counter variable C2 incremented every time window the target number of pulses Np exceeds a predetermined threshold TNp2, TNp2 being greater than TNp1.

44. The computer program product of claim 42, the code for causing a computer to generate a first jammer detection signal further comprising code for causing a computer to generate a first jammer detection signal only if the second jammer detection signal is not generated.

45. The computer program product of claim 44, the first jammer detection signal indicating the presence of a close-in jammer, the second jammer detection signal indicating the presence of a far-away jammer, the first accumulated metric being a close-in jammer counter metric CC1, the second accumulated metric being a far-away jammer CFA.

46. The computer program product of claim 39, the target number of pulses Np in a time window comprising all pulses in a time window.

47. The computer program product of claim 39, the code for causing a computer to count a target number of pulses Np comprising:
code for causing a computer to divide each time window into a plurality of sub-windows;
code for causing a computer to determine the total number of pulses in each sub-window; and
code for causing a computer to accumulate the total number of pulses in each sub-window into the target number of pulses Np only if the total number of pulses in the sub-window exceeds a predetermined threshold Ts.

48. The computer program product of claim 38, the pulse frequency metric comprising a time interval between rising edges of the plurality of digital pulses, the pulse frequency metric indicating whether the pulse frequency metric is greater or less than a predetermined time interval.

* * * * *